US006782431B1

(12) United States Patent
Mukherjee et al.

(10) Patent No.: US 6,782,431 B1
(45) Date of Patent: Aug. 24, 2004

(54) SYSTEM AND METHOD FOR DYNAMIC SELECTION OF DATABASE APPLICATION CODE EXECUTION ON THE INTERNET WITH HETEROGENOUS CLIENTS

(75) Inventors: Rajat Mukherjee, San Jose, CA (US); Daniel Manuel Dias, Mahopac, NY (US); Hidayatullah Habeebullah Shaikh, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 809 days.

(21) Appl. No.: 09/163,724

(22) Filed: Sep. 30, 1998

(51) Int. Cl.[7] .............................................. G06F 15/16
(52) U.S. Cl. ..................... 709/246; 709/203; 709/217
(58) Field of Search ................................ 709/217, 219, 709/231, 232, 233, 246, 247, 218, 228, 229, 203

(56) References Cited

U.S. PATENT DOCUMENTS

| | | | | |
|---|---|---|---|---|
| 5,828,840 A | * | 10/1998 | Cowan et al. | 709/203 |
| 5,838,916 A | * | 11/1998 | Domenikos et al. | 709/219 |
| 5,944,793 A | * | 8/1999 | Islam et al. | 709/220 |
| 6,006,264 A | * | 12/1999 | Colby et al. | 709/226 |
| 6,049,664 A | * | 4/2000 | Dale et al. | 395/701 |
| 6,067,531 A | * | 5/2000 | Hoyt et al. | 705/35 |
| 6,185,625 B1 | * | 2/2001 | Tso et al. | 709/247 |
| 6,212,560 B1 | * | 4/2001 | Fairchild | 709/223 |
| 6,233,584 B1 | * | 5/2001 | Purcell | 707/103 |

OTHER PUBLICATIONS

Publication: NetDynamics White Paper. pp. 1–10. (Internet) PC Magazine Editor's Choice. Sep. 19, 1996. (www.netdynamics.com/about/whitepaper.html), printed Sep. 19, 1996, pp. 1–10.
Brochure: Sybase. "jConnect for JDBC". 4 pgs.
White Paper: I–Kinetics. OPEN JDBC: The Future of Enterprise Database Access with CORBA and JDBC. (Internet). 12 pgs. Copyright 1997, 1998. http://www.i–kinetics.com/wp/ojmgmt/ojmgmt.html.
White Paper: Informix. INFORMIX—Universal Web Connect for Intelligent Web Applications. pp. 1–16. Mar., 1997.
Press Release: Bluestone Software. "Sapphire/Web". 3 pgs. 1997.

* cited by examiner

Primary Examiner—Jack B. Harvey
Assistant Examiner—Beatriz Prieto
(74) Attorney, Agent, or Firm—John L. Rogitz

(57) ABSTRACT

A system and method for dynamically determining whether a client computer or a web site server computer is to process web site database data to render a data structure, such as a web page, in response to a request from the client computer. The request from the client computer implicitly or explicitly indicates the processing capability of the client computer, and if the client's processing capability is sufficient to render the web site data into a web page in fulfillment of the request, and the web server usage is high and server policy permits it, the unprocessed data and necessary classes of processing code are downloaded to the client computer, which then processes the data to render the requested web page. Otherwise, the server computer processes the data and returns the web page to the client computer.

21 Claims, 2 Drawing Sheets

SYSTEM AND METHOD FOR DYNAMIC SELECTION OF DATABASE APPLICATION CODE EXECUTION ON THE INTERNET WITH HETEROGENOUS CLIENTS

BACKGROUND OF THE INVENTION

1. Field of the Invention

The present invention relates generally to local and wide area computer networks, and more particularly to database access by heterogenous computer clients/network appliances and other pervasive computing devices via the World Wide Web.

2. Description of the Related Art

The World Wide Web (hereinafter "Web") is a portion of the Internet that includes computer sites, referred to as "Web sites", which contain information. Typically, a Web site is a collection of software pages in a computer, referred to as a Web server computer, with the software pages being coded in mark-up language code (e.g., Hypertext Markup Language (HTML)). Client computers throughout the world can access the Web sites to retrieve the information contained in the Web pages.

As the Web has developed, Web sites have begun to offer more than just data access to information encoded in mark up languages on Web pages. More specifically, many Web sites contain databases that can be accessed by a database application program, to return information sought by client computers. As an example, the Web site of an airline company might incorporate a database of flight schedules and an associated database application program for searching the database, to permit a client computer to search for and select available flights from a flight database, and then to purchase tickets online, via the Web site.

One conventional way of undertaking a query (search/update) of a Web database is for a client computer to send the request to the Web server, which invokes an interface program using, e.g., a common gateway interface (CGI), FastCGI, or Web server application programming interface (API). In turn, the interface program accesses the database application program that is on the Web server to execute the query. The results are formatted in mark up language by the interface program and then returned via the Web server to the client computer as a Web page. Thus, in this method all database search and processing logic is executed by the Web server.

It happens that it is sometimes advantageous that a client computer execute database search logic, particularly when, e.g., the Web server is busy, to increase the speed with which the Web server can address multiple client computers. Accordingly, in an alternate scheme search logic is sent from a Web server to a client computer in response to a search request from the client, and the client computer then uses the search logic to issue a search query using a query API or equivalent, e.g., Java Database Connectivity (JDBC) code. The query is sent to a JDBC server that is at the Web site but that is separate and distinct from the Web server. Then, the JDBC server interfaces with the database application program to retrieve data that subsequently is unprocessed or only partially processed at the Web site, with the unprocessed or partially processed data being sent back through the chain to the search logic at the client computer for complete processing to, e.g., format and render the Web page using client computer processing resources.

As recognized by the present invention, the above-described scheme for permitting database processing at a client computer suffers several drawbacks. First, the communication between the client computer and the JDBC server (which, it will be recalled, is separate from the Web server) must be effected through access ports other than the port used to access the Web server. Because of this, client computers that are behind software-implemented security "firewalls" such as are provided to, e.g., corporate intranets, might not be permitted to undertake the method at all absent sophisticated and expensive firewall alterations, because many firewalls limit client computer access to only the port (conventionally, the port numbered 80) that is used to communicate with a Web server.

Moreover, owing to the fact that different paths must be used to communicate with the Web server and the JDBC server, the above-described scheme cannot be dynamically changed, but must be hard-wired into the Web site. In other words, the decision as to what site—the Web site or the client site—executes the database processing logic is made a priori and cannot be dynamically changed. This is undesirable because, as recognized herein, many types of network computing appliances with varying degrees of processor power access the Web, with some client appliances being capable of executing database processing logic and other client appliances not being so capable. For example, relatively powerful personal computers might access a Web site, but so might less powerful appliance processors, such as processors contained in cellular telephones or palm-top computers, or even processors in computer-controlled refrigerators and other labor-saving devices. Consequently, the above scheme is not easily scalable for use with a large number of client computers and it moreover is not possible in the case of some relatively low-capability network appliances.

Fortunately, the present invention recognizes that it is possible to overcome the above-noted problems efficiently and effectively.

SUMMARY OF THE INVENTION

The invention is a general purpose computer programmed according to the inventive steps herein to dynamically determine whether to permit a web server to completely execute and process a dynamic web access, such as a query, in a request from a client computer, or to permit the client computer to at least partially process the request based on information provided by the web server computer, to thereby relieve processing load on the web server computer. The invention can also be embodied as an article of manufacture—a machine component—that is used by a digital processing apparatus and which tangibly embodies a program of instructions that are executable by the digital processing apparatus to undertake the present invention. This invention is realized in a critical machine component that causes a digital processing apparatus to perform the inventive method steps herein.

In accordance with the present invention, a computer system includes a client computer having a processing capability and communicating one or more data requests to a web server of a web site, with the web server having access to server data. Logic means are provided for selectively causing server data to be processed at the client computer or at the server computer site, based at least in part on the processing capability of the client computer. As intended by the present invention, the processing of the server data, when undertaken by the client computer, renders a formatted data structure, e.g., a web page or an XML document.

In one preferred embodiment, logic means transmit, to the client computer, code or other logic means for processing the server data when the client computer is to render the server data into an application data format or into a web page in markup language, such as HTML or XML. Also, in the preferred embodiment logic means are provided at the server computer for determining the processing capability of the client computer, based on at least one data request. Moreover, the client computer communicates with the server computer via a first communication port, and the means for processing is transmitted to the client computer via the first communication port, to avoid firewall impediments to the present logic.

If desired, logic means can be provided for causing the server data to be processed at the server computer site when a processing load on the server computer is below a threshold. Also, logic means can be provided for causing the server data to be processed at the server computer site when a data request from the client computer indicates that the server computer is to process server data to render a formatted data structure, regardless of the processing capability of the client computer.

In another aspect, a computer program device includes a computer program storage device readable by a digital processing apparatus, and a program means on the program storage device and including instructions executable by the digital processing apparatus for performing method steps for dynamically determining where data of a web site is to be processed, and to what extent, to render a markup formatted document such as a web page. The method steps include receiving, at a server computer associated with the web site, a signal representative of a client computer request, and then, based at least in part on the signal, determining whether the client computer or the server computer is to process the data to render one or more web pages.

In yet another aspect, a computer-implemented method is disclosed for dynamically determining which of a web server computer and a client computer accessing the web server computer via the Internet processes web site data to render a formatted data product. The method includes determining whether the client computer is characterized by a processing capability sufficient to permit the client computer to process the data for rendering the formatted data product. Also, the method includes assigning the rendering of the formatted data product to the client computer or the server computer, at least in part based on the processing capability.

The details of the present invention, both as to its structure and operation, can best be understood in reference to the accompanying drawings, in which like reference numerals refer to like parts, and in which:

DETAILED DESCRIPTION OF THE PREFERRED EMBODIMENTS

Figure 1:
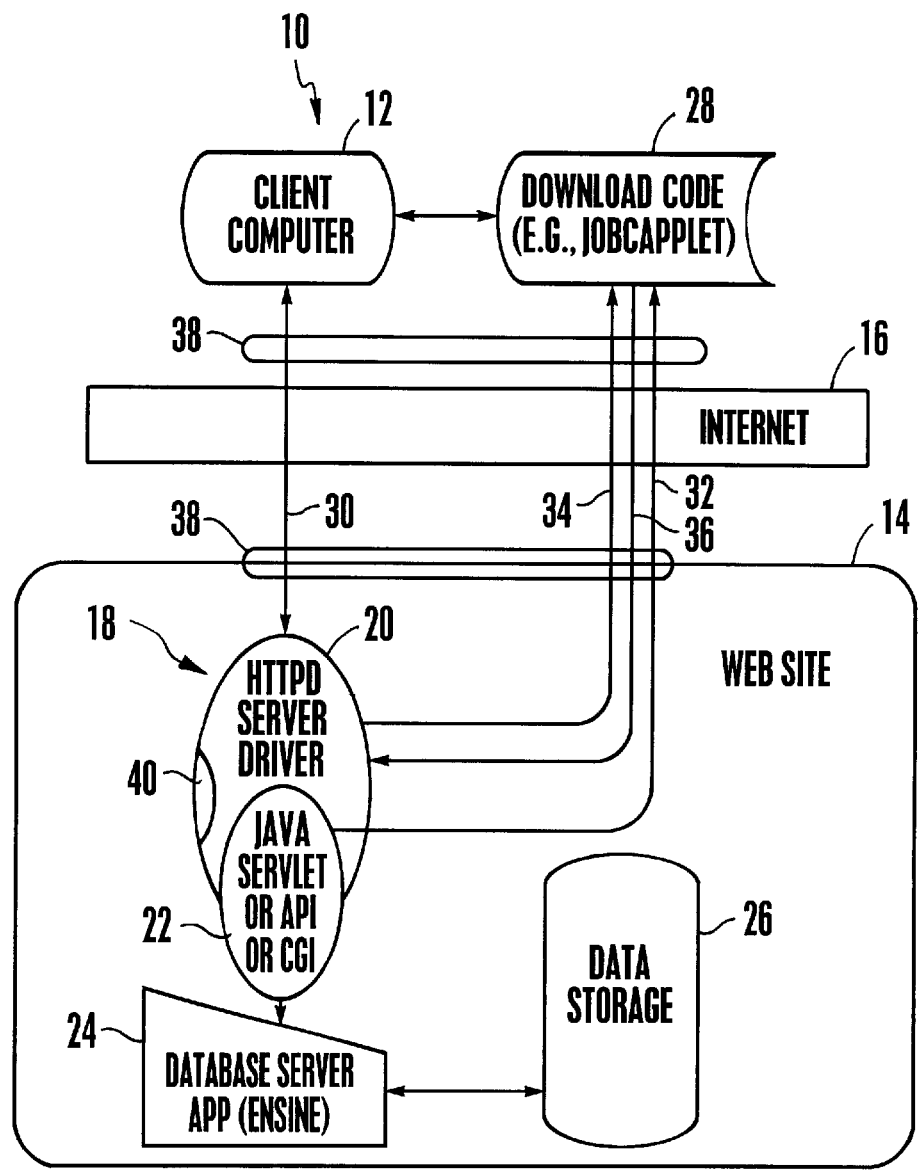
FIG. 1 is a schematic diagram showing the system of the present invention.

Referring initially to FIG. 1, a system is shown, generally designated 10, which includes one or more client computers 12 accessing one or more computer sites, such as a web site 14 of the World Wide Web, via a local area network or wide area computer network, such as an intranet or the Internet 16. As shown, the web site 14 includes a web server computer, generally designated 18, that incorporates driver software such as a web server hypertext transfer protocol daemon process (httpd) 20. Also, unlike the case of the JDBC server discussed above in which the client interacts directly with a process/entity that is distinct from the web server process, the web server (httpd) 20 of the present invention directly incorporates an interface program 22 that interfaces with a web site database application server programs or engine 24. Among other things, this yields high performance in processing queries. In turn, the database application server or engine 24 accesses data stored in a web site database 26, and the data can then be rendered into formatted data products, such as web pages formatted in markup language, in response to requests from the client computer 12. It is to be understood that for scalability (i.e., for simultaneously serving large numbers of client computers 12), the server computer 18 can perform connection management and/or connection pooling to shared database resources.

In one preferred embodiment, the interface program 22 is Java servlet code (using JDBC), or a common gateway interface (CGI), or FastCGI, or an application programming interface (API). The attached code shows an illustrative example of portions of the web server (httpd) 20 with interface program 22.

As discussed in further detail below, the present invention dynamically determines whether the rendering of the web site data into web pages is undertaken at the web site 14 (by the interface program 22), with the web pages then being delivered to the client computer 12 as a final product, or whether the rendering of the web site data into web pages is undertaken by the client computer 12. When undertaken by the client computer 12, not only is unprocessed or partially processed data from the web site database 26 transmitted to the client computer 12, but appropriate interface code with associated classes of processing code, collectively designated 28 are downloaded or otherwise provided to the client computer 12 as well.

Owing to the close association of the interface program 22 with the web server (httpd) 20 at the web server computer 18, all data accesses, including those accesses schematically labelled 30, 32, 34, 36 in FIG. 1, are communicated through a single common communication port 38. In the preferred embodiment, the communication port 38 is the port typically designated "80" as a web server communication port. Consequently, the processes of the present invention are unimpeded by any security firewall that might protect the client computer 12.

It is to be understood that the computers of the present invention can be general purpose computers appropriate for their intended functions and programmed to undertake the method steps set forth herein. For example, the computers can be desktop computers such as personal computers or laptop computers made by International Business Machines Corporation (IBM) of Armonk, N.Y. Alternatively, the computers of the present invention may be any computer, including computers sold under trademarks such as AS400, with accompanying IBM Network Stations or, Unix computers, or OS/2 servers, or Windows NT servers, or IBM RS/6000 workstations, or other equivalent devices. Indeed, the client computer 12 can be any network appliance, i.e., any processing apparatus communicating with the Internet. As further examples, the client computer 12 can be a computer associated with a wireless telephone, or an automated device such as, e.g., a refrigerator, vehicle, aircraft, or any other network appliance.

Figure 2:
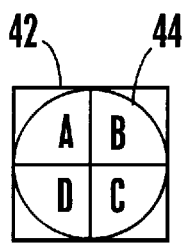
FIG. 2 is a schematic diagram of a computer program device.

In accordance with the present invention, a load allocation module 40 is incorporated into one of the present computers, e.g., the web server (httpd) 20, to undertake inventive method steps set forth below in reference to FIG. 3. In a preferred embodiment, the load allocation module 40 is incorporated by the web server computer 18 as shown. It is to be understood that the control components such as the load allocation module 40 are executed by logic components such as are embodied in logic circuits or in software contained in an appropriate electronic data storage, e.g., random access memory (RAM), or hard disk drive and/or optical disk drive, or DASD array, magnetic tape, electronic read-only memory, or other appropriate data storage device that is conventionally coupled to the computer that executes the module 40. Or, the control components can be embodied in other logical components such as a computer diskette 42 shown in FIG. 2. The diskette 42 shown in FIG. 2 has a computer usable medium 44 on which are stored computer readable code means (i.e., program code elements) A–D.

The flow charts herein illustrate the structure of the present logic. Those skilled in the art will appreciate that the flow charts illustrate the structures of logic elements, such as computer program code elements or electronic logic circuits, that function according to this invention. Manifestly, the invention is practices in its essential embodiment by a machine component that renders the logic elements in a form that instructs a digital processing apparatus (that is, a computer) to perform a sequence of function steps corresponding to those shown. In other words, the load allocation module 40 may be a computer program that is executed by a processor within the associated server computer 18 as a series of computer-executable instructions. In an illustrative embodiment of the invention, the computer-executable instructions may be lines of compiled $C^{++}$ or Java compatible code.

Figure 3:
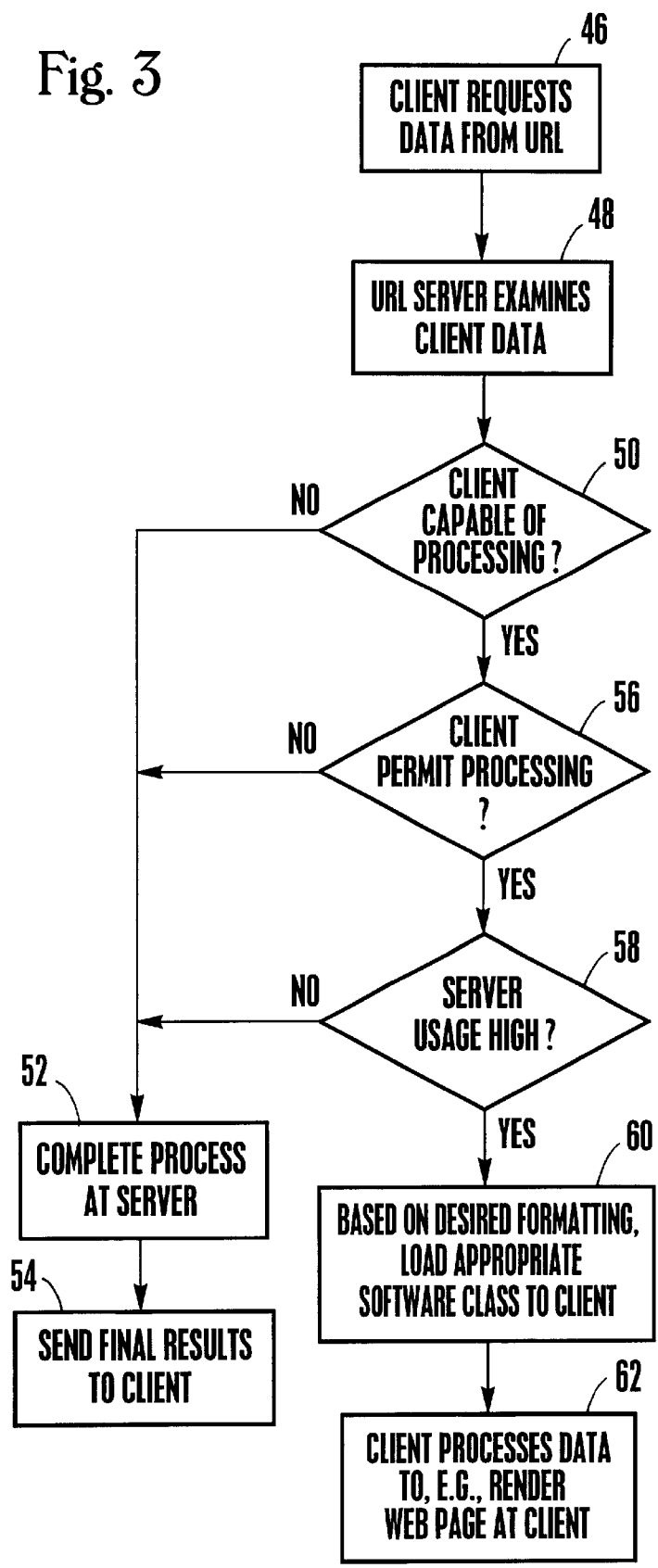
FIG. 3 is a flow chart showing the logic of the present invention.

Now referring to FIG. 3, the logic of the present invention can be seen. Commencing at block 46, the client computer 12 transmits a request for data to the server computer 18 using the universal resource locator (URL) within the web site 14. The request can have a database query embedded in it, or the query can be implicit in the request, or constructed dynamically, or the query can be a predetermined query. Thus, at block 46 a signal that is representative of a client computer request is received.

At block 48 the server computer 18 examines the data in the client request to determine a processing capability of the client computer 12. This processing capability may be explicit or implicit in the request. For example, the identity of the browser of the client computer 12 can be correlated to a processing capability of the client computer 12. Or, specific client parameters, e.g., the address of the client, or a previously deposited client cookie, can indicate the processing capability of the client computer 12.

In addition, the server computer 18 also examines the client request to determine in what format the data should be sent to the client computer 12. For example, as more fully set forth below, the data format might incorporate hypertext markup language (HTML), or XML, or XSL, or text format, or data format, depending on which computer will undertake final processing of the data.

Moving to decision diamond 50, the logic determines, based on the client computer 12 processing capability, whether the client computer is capable of processing data from the database 26 to render properly formatted data structure or product, e.g., a web page, in satisfaction of the request. If not, the logic moves to block 52, wherein the request is completely processed at the server computer 18. Moving to block 54, the final results, typically HTML- or XML-formatted web pages, are then transmitted back to the client computer 12. For this server side processing, the server computer 18 can use the same code (e.g., Java classes to process JDBC results sets) as used by the client computer 12 in the event the client computer 12 at least partially processes the request as set forth below, or the server computer 18 can use, e.g., specific native calls to C libraries or other classes of code.

If, on the other hand, it is determined at decision diamond 50 that the client computer 12 is capable of at least partially processing the request, in one preferred embodiment the logic moves to decision diamond 56, wherein it is determined whether the client computer 12 has indicated that it is willing to undertake processing that otherwise would be undertaken by the server computer 18 (e.g., in rendering web pages). If not, the logic moves to block 52, but otherwise the preferred logic moves to decision diamond 58.

At decision diamond 58, the server computer 18 can, if desired, determine whether its current processor usage exceeds a threshold, and unless it does, the server computer 18 undertakes all request processing at block 52. That is, if desired the server computer 18 can undertake all processing, even if the client computer 12 is capable of undertaking some or all of the processing, if the server computer 18 is not excessively busy. Accordingly, it is to be understood that it might be desirable from time to time to allocate query processing based not client computer capability, but rather based on factors that are internal to the web server, e.g., based on server load.

If the server computer 18 determines that it is relatively busy, the logic moves to block 60. At block 60, based on the desired formatting as explicitly or implicitly set forth in the client request, appropriate software, e.g., the processing code 28 shown in FIG. 1, is downloaded (i.e., is transmitted) from the server computer 18 to the client computer 12. For example, an applet that uses JDBC for access to the server computer can be downloaded or otherwise provided to the client computer 12, with the applet executing queries by invoking JDBC calls that are translated at the client computer to web accesses using a web server API or the Java servlet API that return data to the applet. Then, the applet can dynamically download both the necessary data in the result set to be processed, along with code classes that are appropriate for formatting or otherwise processing the result set at block 62 as defined by the query. At the web server 18, the JDBC requests can be implemented using Java servlets or web server APIs such as NSAPI, ISAPI, or GWAPI. In sending the formatting classes to the client computer 12, the server computer 18 uses information obtained at block 48 regarding desired formatting. It will be appreciated by the skilled artisan that the client computer/network appliance may download only the formatting classes/applets once during a given session and need not do so for every query.

While the particular SYSTEM AND METHOD FOR DYNAMIC SELECTION OF DATABASE APPLICATION CODE EXECUTION ON THE INTERNET WITH HETEROGENOUS CLIENTS as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular means "at least one"

unless otherwise recited. As but one example of an equivalent system, a proxy server or other server could be interposed between the server computer 18 and client computer 12, with the main server being off-loaded to the proxy server and with the proxy server in turn undertaking some or all the above-described functions of the client computer 12 and then sending formatted results to the client computer 12. Under these circumstances, the proxy server establishes all or part of a client computer for purposes of the claims.

We claim:

1. A computer system including at least one client computer having a processing capability and communicating one or more data requests to at least one web server of a web site, the web server having access to server data, comprising:

logic means for selectively causing server data to be processed at the client computer or at the web site, based at least in part on the processing capability of the client computer, the processing of the server data rendering a formatted data structure; and logic means for causing the server data to be processed at the web site when a data request from the client computer indicates that the web server is to process server data to render a formatted data structure, regardless of the processing capability of the client computer.

2. The system of claim 1, wherein the formatted data structure includes a web page.

3. The system of claim 1, wherein the formatted data structure includes an application data format.

4. The system of claim 1, further comprising logic means for transmitting, to the client computer, logic means for processing the server data when the client computer is to render the server data into a web page.

5. The system of claim 4, wherein the client computer communicates with the server computer via a first communication port, and wherein the logic means for processing the server data is transmitted to the client computer via the first communication port.

6. The system of claim 5, further comprising:

logic means for causing the server data to be processed at the server computer site in response to one or more factors that are internal to the server computer.

7. The system of claim 6, wherein the one or more factors include a processing load on the server computer.

8. The system of claim 4, wherein the logic means for processing includes an interface program.

9. The system of claim 1, further comprising logic means at the server computer site for determining the processing capability of the client computer, based on at least one data request.

10. A computer program device comprising:

a computer program storage device readable by a digital processing apparatus; and a program means on the program storage device and including instructions executable by the digital processing apparatus for performing method steps for dynamically determining where data of a web server is to be processed to render server resident data in a format such as a web page, the method steps comprising:

receiving, at a web server computer associated with a web site, a signal representative of a client computer request;

transmitting to the client computer, from a JDBC server, logic means for processing the data into a markup language formatted document such as a web page, when the client computer is to process the data; and based at least in part on the signal, determining whether the client computer or the server computer is to process the data to render the database data, wherein the signal representative of a client computer request and the logic means for processing are communicated via a common communication port.

11. The computer program device of claim 10, wherein the method steps further include incorporating an interface program selected from the group of programs including servlets using JDBC, CGI, FastCGI, and API, into the server computer.

12. The computer program device of claim 11, wherein the method steps further include incorporating, into the client computer, a client program selected from the group of programs including applets using JDBC, and JDBC driver programs, the client program accessing the interface program of the server computer.

13. The computer program device of claim 10, wherein the method steps further comprise causing the database data to be processed at the web server in response to one or more factors that are internal to the server computer.

14. The computer program device of claim 13, wherein the one or more factors includes a processing load on the server computer.

15. The computer program device of claim 14, wherein the method steps further comprise causing the data to be processed at the web server when a data request from the client computer indicates that the server computer is to process data to render a formatted data structure, regardless of the processing capability of the client computer.

16. A computer-implemented method for dynamically determining which of a web server computer and a client computer accessing the web server computer via the Internet processes web site data to render a formatted data product, comprising:

determining whether the client computer is characterized by a processing capability sufficient to permit the client computer to process the data for rendering the formatted data product;

at least in part based on the processing capability, assigning the rendering of the formatted data product to the client computer or the server computer; and causing the data to be processed at a web site when a request from the client computer indicates that the server computer is to process data to render a formatted data structure, regardless of the processing capability of the client computer.

17. The method of claim 16, further comprising transmitting to the client computer code necessary to process the data, the code being selected from the group including applets using JDBC, JDBC drivers, and formatting classes.

18. The method of claim 17, wherein the determining step is undertaken based on a client computer request to the server computer via a first communication access port, and the computer code necessary to process the data is transmitted through the first communication access port.

19. The method of claim 17, further comprising associating an interface program selected from the group of programs including servlets using JDBC, CGI, FastCGI, and API, with the server computer.

20. The method of claim 17, further comprising causing the data to be processed at a web site associated with the server computer when a processing load on the server computer is below a threshold.

21. The method of claim 20, further comprising causing the data to be processed at a web site associated with the server computer based on at least one factor internal to the server computer.

\* \* \* \* \*